Oct. 7, 1930.　　　　K. BÖMCKE　　　　1,777,957

GAS PURIFYING APPARATUS

Filed March 25, 1927　　　3 Sheets-Sheet 1

Section x-x

Section y-y

Section z-z

Oct. 7, 1930.  K. BÖMCKE  1,777,957
GAS PURIFYING APPARATUS
Filed March 25, 1927    3 Sheets-Sheet 2
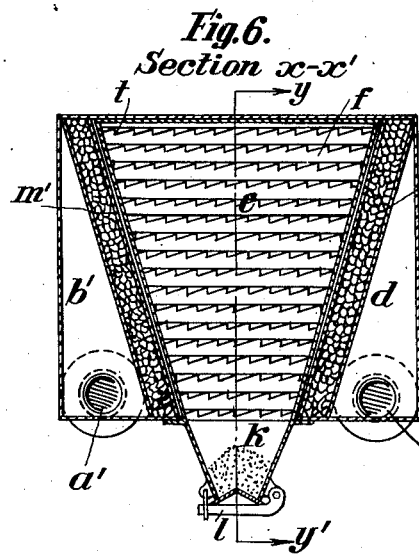
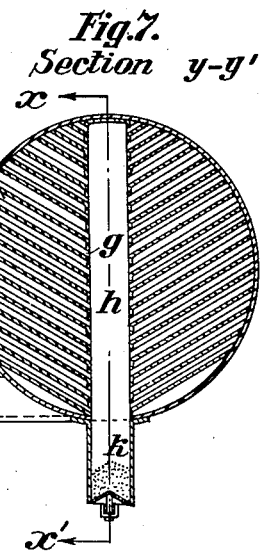
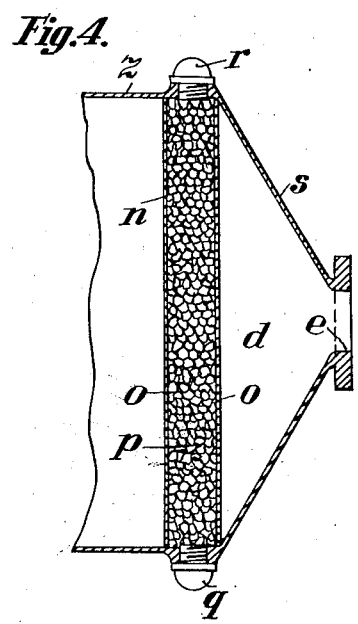
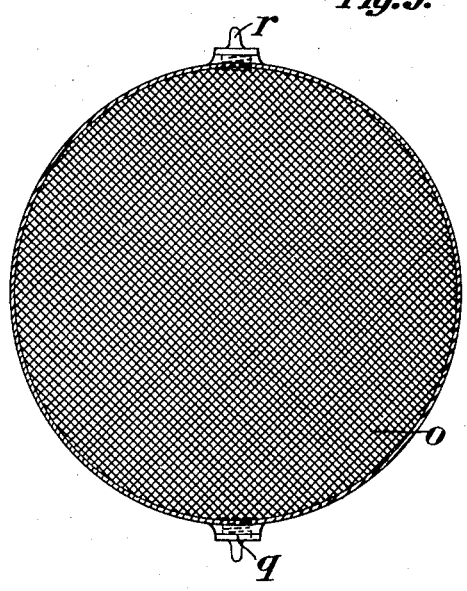

Oct. 7, 1930.  K. BÖMCKE  1,777,957

GAS PURIFYING APPARATUS

Filed March 25, 1927   3 Sheets-Sheet 3

Patented Oct. 7, 1930

1,777,957

UNITED STATES PATENT OFFICE

KURT BÖMCKE, OF NEUBABELSBERG-BERGSTUCKEN, NEAR BERLIN, GERMANY, ASSIGNOR TO FIRM DEUTSCHE ERDÖL-AKTIENGESELLSCHAFT, OF BERLIN-SCHONEBERG, GERMANY

GAS-PURIFYING APPARATUS

Application filed March 25, 1927, Serial No. 178,444, and in Germany December 23, 1925.

This invention relates to apparatus for removing dust from gas or air which may be employed to advantage for purifying the driving gas supplied to engines for vehicles. The advantages of the invention mainly consist in a considerable diminution in the space necessary for the purification of the gas accompanied by an improved purifying capacity this being of particular importance in apparatus of this character for use on motor vehicles.

The improved apparatus which is of comparatively light weight can be used for a considerable time on vehicles, for instance longer than a week if desired, without interruption and with undiminished purifying capacity, without it being necesary to remove the dust that may have collected therein.

A further advantage of the apparatus is that although it is very seldom necessary to remove the separated dust, the resistance offered to the gases by the apparatus during the whole period of operation remains the same. This is particularly important as regards the use of the apparatus on motor vehicles, because if the resistance to the flow of gas increased the capacity of the motor would be greatly decreased. Dry gas-purifying devices employing sieves, pieces of felt or the like, hitherto employed for motor vehicles, resulted in choking or increased resistance to the flow of gas and this reduced the capacity of the motor which could only be prevented by continually cleansing the device or changing the pads.

The invention utilizes the well known principle of separating dust from a gas by means of gravity. In order to obtain a rapid purification of the gas, the velocity of the gas must be substantially decreased by widening the cross section of the passage through which the gas is flowing and moreover, it is essential that the gas should be permitted to flow substantially horizontally, so that the particles of dust can fall vertically under gravity perpendicular to the flow of the gas.

In this connection it has already been proposed, in order to decrease the length of the path of the gas over which separation of dust takes place, to provide inclined plates at short distances apart in this path. In this case however, it was necessary, in order to attain a uniform distribution of the flow of gas over the whole cross sectional area of the space in which the plates were provided, to effect a gradual widening of the space from the point of entrance of the gas into the purifying apparatus to the commencement of the portion in which the plates were provided, but this necessitated a great amount of space, such as is not available for example on vehicles. Similarly the gas, upon leaving the actual purifying device, that is to say the space in which the plates were provided had to converge again in order to obtain an increased velocity of flow of the gas, but this decrease in cross sectional area had to be effected gradually, that is to say over a comparatively large space.

The present invention enables the widening and subsequent restriction of the cross sectional area of the passage for the entrance of the gas to, and its exit from the purifying apparatus to be effected over a comparatively small space whilst nevertheless obtaining a uniform distribution of the gas over the entire cross sectional area of the apparatus. For this purpose so-called equalizing devices are provided at the entrance to, and exit from, the dust separating space proper, these devices which are arranged to offer but slight resistance to the flow of gas and extend over the entire cross sectional area of the flow passage of the apparatus being provided with a considerable number of passages or channels arranged therein.

Further features of the invention consist in the particular method of construction of the plates on which the separation of the dust is effected arranged between the so-called equalizing devices.

The invention will now be described, by way of example with reference to the accompanying drawings in which Figure 1 is a vertical sectional view, on the line X—X of Figure 2, of one constructional form of the invention, Figure 2 being a vertical cross sectional view on the line Y—Y of Figure 1.

Figure 4 is a sectional view on a larger scale of one end of the device illustrated in Figure 1, showing one of the equalizing devices in greater detail.

Figure 5 is a front view of an equalizing device.

Figure 6 is a vertical sectional view of a somewhat different constructional form of the device on the line X—X' of Figure 7, Figure 7 being a cross sectional view on the line Y—Y' of Figure 6.

Figure 1:
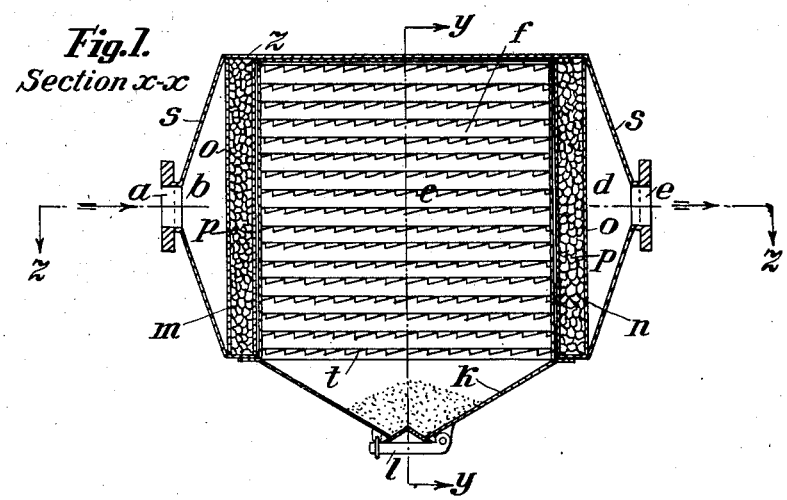
Figure 2:
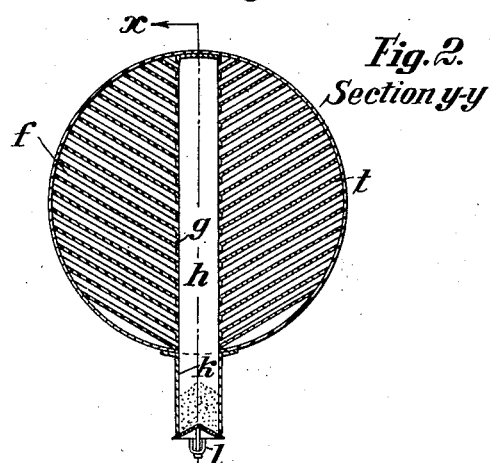
Figure 3:
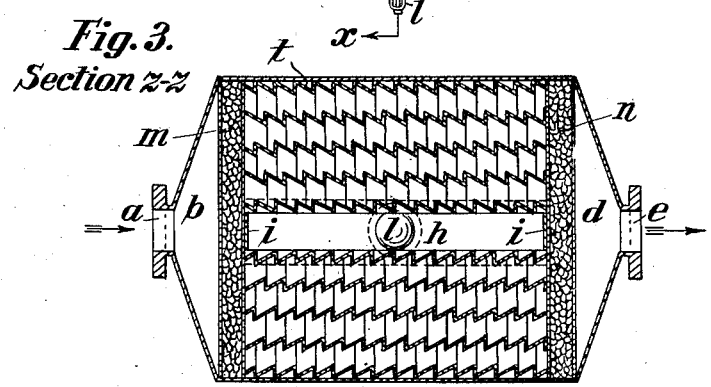
Figure 3 is a horizontal sectional view on the line Z—Z of Figure 1.

Referring first to Figures 1 to 3, the gas to be purified passes in the direction of the arrow, through an aperture $a$ into the substantially barrel shaped casing $s$ of the purifying apparatus. The walls of the chamber $b$ at the rear of the aperture $a$ in the casing $s$ diverge from the aperture at a considerable angle as shown in the drawing, so that the velocity of the gas which enters at $a$ rapidly diminishes on account of the considerable increase in cross sectional area of the passage through which the gas is flowing, such a decrease in the velocity of the gas being necessary in order to effect the separation of the particles of dust from the gas flowing in the interior of the purifying apparatus.

At the position where the enlarged cylindrical portion $z$ of the casing $s$ commences, a so-called equalizing device $m$ is mounted inside the casing, this device, in spite of the sudden enlargement of a passage of comparatively small cross sectional area to a passage of substantially greater cross sectional area, providing for a uniform distribution of the gas over the entire cross sectional area of this enlarged passage.

The device $m$ consists, as will be observed by reference to Figures 4 and 5, of two horizontal wire grids $o$, $o$, which are arranged at a distance apart of approximately 5 cm. to 10 cm. and extend over the entire cross sectional area of the portion $z$ of the purifying apparatus. Between the wire grids $o$ $o$ a filling $p$ composed of glass beads, aluminium beads, shingle or the like having a size of grain of about 3 mm. to 10 mm. diameter is arranged. The mesh of the wire grids $o$ is preferably such that the grids will not offer any appreciable resistance to the flow of gas, while on the other hand preventing the passage of the filling $p$.

By this arrangement of the device $m$ the gas entering the space $b$ is held back by the device $m$, as the latter in view of the restricted passages therethrough, offers a certain amount of resistance to the flow of the gas. By this holding back of the gas and in spite of the short length of the passage $b$ the gas is distributed uniformly over the entire cross sectional area of the device $m$ whence it flows in uniformly distributed horizontal streams on the other side out of the device $m$ into the actual dust separating chamber $c$ in which are arranged a number of plates $t$ which are arranged one above the other at distances apart of from 10 to 20 mm., in such a manner that from the outer casing $z$ of the chamber towards the middle portion thereof the plates are inclined at angles of approximately 30 to 45°, as will be observed by reference to Figure 2. The plates $t$ are connected at their outer periphery to the casing $z$ of the dust separating chamber $c$, and at their inner periphery to a passage $h$, which extends centrally through the chamber $c$. The spaces $f$ between the individual inclined plates $t$ are only in communication with the passage $h$ through narrow passages $g$ through which the dust separated from the gas by the plates $t$ can trickle into the trough $k$.

Whilst the gas flows from the equalizer $m$ at a low velocity through the chambers formed between the inclined plates $t$ substantially in a horizontal direction towards the opposite end of the purifying apparatus, the particles of dust contained in the gas have time to fall down under the action of gravity and after falling a short distance reach the surface of the plates $t$ and slide thereon through the passages $g$ into the passage $h$, which is closed at each of its extremities $i$, $i$, (Figure 3), so that no appreciable flow of gas can take place therein.

The separated dust trickles through the passage $h$ into the trough $k$ at the bottom of the chamber $c$ and can be removed therefrom from time to time by removing the closure $l$.

If the inclined plates are constructed of light metal such as aluminium, or a metallic alloy of similar properties then in addition to the advantage of slight weight the further advantage of the cooling of the gas on account of the high heat conductivity of such metals becomes evident. The casing $z$ of the purifier may also be cooled from the outside and thus the gas may be cooled at the same time as it is purified, which on account of the consequent decrease in the volume of the gas results in a decrease in the velocity thereof.

After the gas has flowed slowly through the spaces between the plates $t$ and the dust has thereby been precipitated by gravity, it passes into a second equalizing device $n$, the construction of which is similar to that of device $m$. On account of the resistance offered by the device $n$, the gas is again held back and is thus forced to pass in a uniformly finely distributed stream through the device $n$. The purified gas upon passing out of the device $n$ is collected in a very short passage $d$, the cross sectional area of which decreases substantially the velocity of the gas being correspondingly increased thereby. The gas is then removed through the aperture e with which the gas outlet pipe is connected.

If the device n were omitted, then the action of the device m alone would be insufficient, as the unpurified gas passing therefrom would flow in the straightest direction towards aperture e and as the gas would not flow in horizontal and parallel streams through the purifying chamber it could not be very thoroughly freed from dust.

As will be evident from the foregoing description, the actual separation of the dust is effected in the chamber c by means of the plates t, whilst in the filling p between the wire grids b of the devices m, n, no appreciable separation of dust will take place, whereby the devices m, n, are prevented from becoming choked and offering an increased resistance to the passage of gas which would be very disadvantageous. By employing spherical-shaped bodies having smooth surfaces, such as glass beads, for the filling p, the separation of the dust in the devices m, n, is substantially prevented. Moreover in place of wire grids having filling therebetween, discs of suitable thickness may be employed such discs being traversed by a great number of straight, cylindrical passages of about 2 to 3 mm. diameter and closely situated to one another.

The difference in pressure of the gas on opposite sides of the devices m, n would then depend primarily upon the number and the length of and the wall friction in the cylindrical passages.

Figure 8:
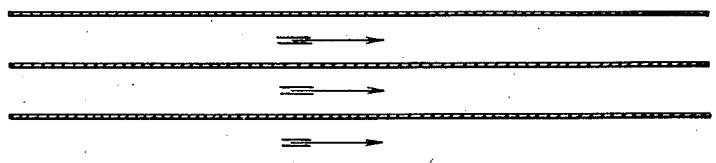
Figures 8 to 12 are sectional views on a larger scale through parts of the plates of different constructional forms as employed in the apparatus.
Figure 9:
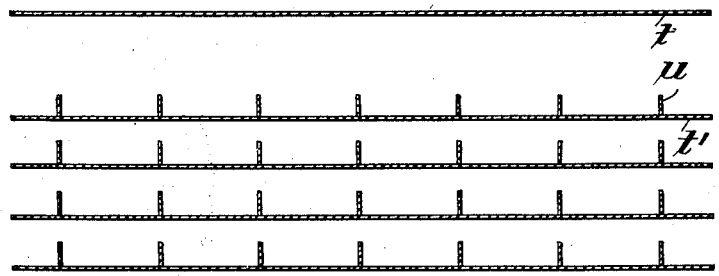
Figure 10:
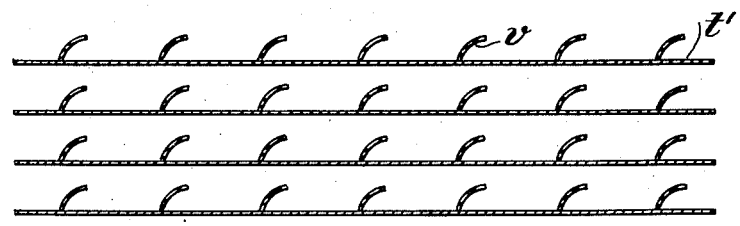

The dust separating action of the plates t is substantially increased if they are arranged not as shown for example, in cross section in Figure 8, but have elements which are transversely arranged to the direction of the flow of gas, mounted thereon, as, for example small straight lists u as illustrated in Figure 9 or inclined and curved lists v as illustrated in Figure 10. These small lists in considerable numbers act as dust collectors as in front of them a whirling action takes place whilst they act as wind screens for the space behind them, as is the case for instance with the well known snow walls.

Figure 11:
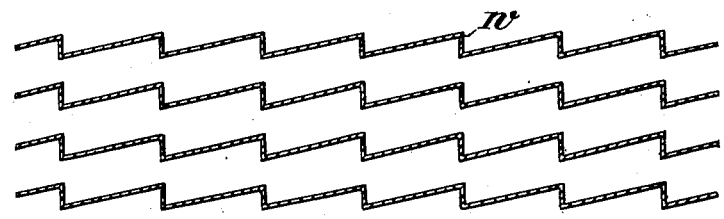
Figure 12:
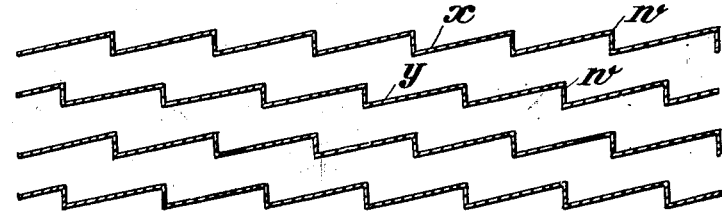

Plates of this character can be produced in a simple manner by pressing the plates in a wave-formed configuration somewhat in the form of a saw, as is illustrated at w in Figure 11. If the plates x and y of the latter cross sectional form are disposed with respect to each other in such a manner as illustrated in Figure 12, that is to say, if the teeth w of each of the superimposed plates are displaced by about half the length of a tooth with respect to the teeth, in the adjacent plates on each side, a separation of dust, five times more effective than is obtainable when employing flat plates as illustrated in Figure 8, may be effected according to tests carried out.

One of the features of the present invention is, in accordance with the preceding description, the employment of an equalizing device, which ensures a uniform distribution of the flow of gas, over the entire cross sectional area of the gas purifying chamber c, one advantage of this arrangement being that the flow passages can be very much shortened and the size of the whole apparatus greatly reduced without altering the capacity. Furthermore, apparatus constructed according to the present invention has the advantage that only a small amount of dust is separated in the passages b, d on account of their short length so that cleansing of these passages is seldom necessary.

In purifying apparatus as hitherto employed however, a considerable amount of dust may be separated, in the passages corresponding to the passages b and d thus necessitating the provision of special cleansing ports and frequent cleansing of the passages.

The device m and n (Figures 4 and 5) are so constructed that their filling p of glass beads or the like, can be removed by opening a closure or bolt q arranged at the bottom of the device. The beads can then be freed from any dust adhering thereto by means of water, and can be returned without any loss of filling material through an upper opening in the device which can then be closed by means of bolt r.

Whereas in the constructional forms of the invention illustrated in Figures 1 to 3 the stream of gas to be purified flows from the inlet port a to the outlet port e without deviation through the dust separator, in the constructional form illustrated in Figures 6 and 7 the gas supply port a' and the gas outlet port e' are each located in a plane perpendicular to the axis of the dust separating device.

This arrangement makes possible a still further reduction in the size of the purifying chamber. Otherwise the construction of this device corresponds entirely with that previously described. The equalizing devices m' and n' are here arranged in an inclined direction, so that the chambers b' and d' having cross sectional enlargement or restriction for the inflow and outflow of the gas respectively are formed in recesses in the cylindrical casing s'.

The arrangements herein described can with advantage also be employed in stationary installations as well as in installations on vehicles and also for the purification of the air from dust for any desired purpose.

Having now particularly described and ascertained the nature of my said invention, I declare that what I claim is:—

1. Gas-purifying apparatus for the dry separation of dust from gas or air under the action of gravity, and particularly for use on motor vehicles, comprising a chamber having an entrance and an outlet opening for the gases, said chamber having a greater cross sectional area than said openings, an equalizing device arranged behind said entrance opening within said chamber of greater cross sectional area, said equalizing device having a considerable number of restricted passages therethrough for uniformly dividing the gas passing through said chamber into a number of streams of relatively low velocity over the whole cross sectional area of said chamber, a dust separating means in said chamber comprising parallel plates arranged behind said equalizing device within said dust separating chamber, said parallel plates being arranged at short distances the one above the other and serving for guiding the gas streams flowing through the purifier.

2. Gas-purifying apparatus for the dry-separation of dust from gas or air under the action of gravity, and particularly for use on motor vehicles, comprising a chamber having an entrance and an outlet opening for the gases, said chamber having a greater cross sectional area than said openings, an equalizing device arranged behind said entrance opening within said chamber of greater cross sectional area, a second equalizing device corresponding to said first named device, said second equalizing device being arranged within said chamber before said outlet opening, both said equalizing devices having a considerable number of restricted passages for the gas therethrough, said equalizing devices being arranged at a distance from one another, a dust separating chamber being formed between both said devices, parallel plates within said dust separating chamber between both said equalizing devices, said parallel plates being arranged at short distances the one above the other and serving for guiding the gas streams flowing through the purifier.

3. Gas-purifying apparatus for the dry separation of dust from gas or air under the action of gravity, and particularly for use on motor vehicles, comprising a chamber having an entrance and an outlet opening for the gases, said chamber having a greater cross sectional area than said openings, an equalizing device arranged behind said entrance opening within said chamber of greater cross sectional area, said equalizing device having a considerable number of restricted passages therethrough for uniformly dividing the gas passing through said chamber into a number of streams of relatively low velocity over the whole cross sectional area of said chamber, a dust separating means in said chamber, comprising parallel plates arranged behind said equalizing device within said dust separating chamber, said parallel plates being arranged at short distances the one above the other and serving for guiding the gas streams flowing through the purifier, and transverse rib-shaped projections on said parallel plates.

4. Gas-purifying apparatus for the dry separation of dust from gas or air under the action of gravity, and particularly for use on motor vehicles, comprising a chamber having an entrance and an outlet opening for the gases, said chamber having a greater cross sectional area than said openings, an equalizing device arranged behind said entrance opening within said chamber of greater cross sectional area, said equalizing device having a considerable number of restricted passages therethrough for uniformly dividing the gas passing through said chamber into a number of streams of relatively low velocity over the whole cross sectional area of said chamber, a dust separating means in said chamber, comprising parallel plates arranged behind said equalizing device within said dust separating chamber, said parallel plates being arranged at short distances the one above the other and serving for guiding the gas streams flowing through the purifier, and transverse rib-shaped projections on said parallel plates, said transverse projections of each plate being arranged in staggered relationship to those of the adjacent plates on each side.

In testimony whereof I have hereunto set my hand.

KURT BÖMCKE.